（12）United States Patent
Jubert

(10) Patent No.: US 7,813,073 B2
(45) Date of Patent: *Oct. 12, 2010

(54) RECORDING DATA SIMULTANEOUSLY AT TWO DEPTHS OF A TILTED MAGNETIC MEDIUM

(75) Inventor: Pierre-Olivier Jubert, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 209 days.

This patent is subject to a terminal disclaimer.

(21) Appl. No.: 12/055,890

(22) Filed: Mar. 26, 2008

(65) Prior Publication Data

US 2009/0040642 A1    Feb. 12, 2009

Related U.S. Application Data

(63) Continuation of application No. 11/837,090, filed on Aug. 10, 2007, now Pat. No. 7,773,333.

(51) Int. Cl.
G11B 21/02    (2006.01)

(52) U.S. Cl. ............................. 360/75; 360/62; 360/76; 360/77.12

(58) Field of Classification Search ........................ None
See application file for complete search history.

(56) References Cited

U.S. PATENT DOCUMENTS

| | | | | |
|---|---|---|---|---|
| 5,247,397 A | * | 9/1993 | Sato et al. | 360/17 |
| 5,250,354 A | | 10/1993 | Ejiri | 428/336 |
| 5,496,620 A | * | 3/1996 | Kitakami et al. | 428/212 |
| 5,534,324 A | * | 7/1996 | Sugita et al. | 428/829 |
| 5,569,523 A | * | 10/1996 | Thoma et al. | 428/213 |
| 6,122,129 A | * | 9/2000 | Aoki et al. | 360/73.06 |
| 6,236,800 B1 | * | 5/2001 | Nishima et al. | 386/46 |
| 6,590,852 B1 | | 7/2003 | McCormick, Jr. | 369/112.23 |
| 6,665,235 B2 | | 12/2003 | Murakami et al. | 369/13.06 |
| 6,700,729 B1 | * | 3/2004 | Beck et al. | 360/76 |
| 6,894,856 B2 | * | 5/2005 | Nakamura et al. | 360/55 |

(Continued)

FOREIGN PATENT DOCUMENTS

JP    63253780    10/1998

OTHER PUBLICATIONS

"Magnetic Dot Arrays With Multiple Storage Layers", Albrecht, et al., Journal of Applied Physics 97, 103910(2005).

(Continued)

*Primary Examiner*—Dismery E Mercedes
(74) *Attorney, Agent, or Firm*—John H. Holcombe

(57) ABSTRACT

Methods and recording systems are configured for recording different data simultaneously at two different depths of a tilted magnetic medium, the tilted magnetic medium having a hard axis of magnetization, the axis being out of a plane of the medium and at an angle of −10 to −80 degrees with respect to a direction along which data are recorded, the medium being capable of having two depths of recording. A method embodies writing with selected magnetic fields whose amplitudes and whose angles with respect to the medium hard axis direction differ at the two depths of the medium such that the recorded direction of magnetization at the respective two depths can be set independently.

15 Claims, 8 Drawing Sheets

FIG. 3

U.S. PATENT DOCUMENTS

| | | | |
|---|---|---|---|
| 7,106,555 B2 * | 9/2006 | Kikuiri et al. | 360/125.41 |
| 7,144,640 B2 * | 12/2006 | Hee et al. | 428/827 |
| 7,180,694 B2 * | 2/2007 | Kawashima et al. | 360/72.3 |
| 7,428,118 B2 * | 9/2008 | Duran | 360/75 |
| 7,468,852 B2 * | 12/2008 | Nishida et al. | 360/66 |
| 2004/0233578 A1 * | 11/2004 | Gao | 360/125 |
| 2005/0084715 A1 | 4/2005 | Hee et al. | 428/694 |
| 2008/0266709 A1 * | 10/2008 | Albertini et al. | 360/110 |

OTHER PUBLICATIONS

"An Approach to Recording on Tilted Media", Richter, IEEE Transactions on Magnetics, vol. 29, No. 5, Sep. 1993, pp. 2258-2265.

"Single-Domain Model for Toggle MRAM", D C Worledge, IBM J Res. & Dev., vol. 50, No. 1, Jan. 2006, pp. 69-79.

* cited by examiner

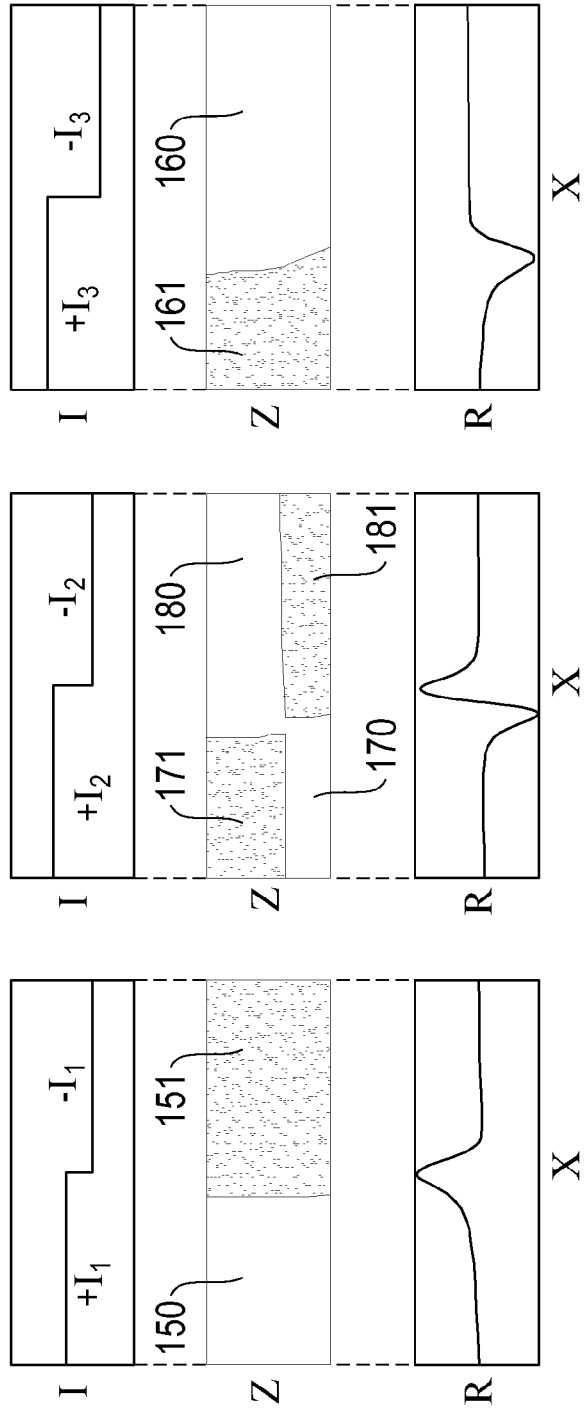

| To<br>From | +1/+1 (+I1) | +1/-1 (-I2) | -1/+1 (+I2) | -1/-1 (-I1) |
|---|---|---|---|---|
| +1/+1 (+I1) | X | (d) | (c) | (a) |
| +1/-1 (-I2) | (-c) | X | (f) | (b) |
| -1/+1 (+I2) | (-b) | (-f) | X | (c) |
| -1/-1 (-I1) | (-a) | (-d) | (-e) | X |

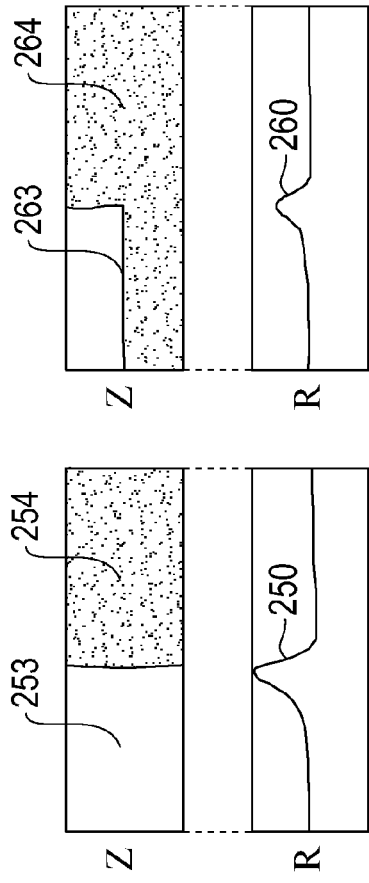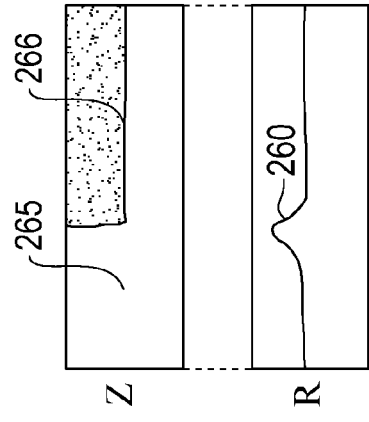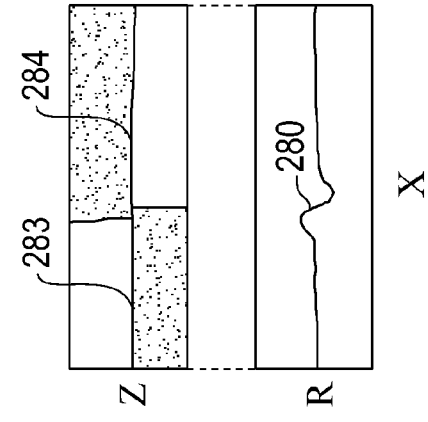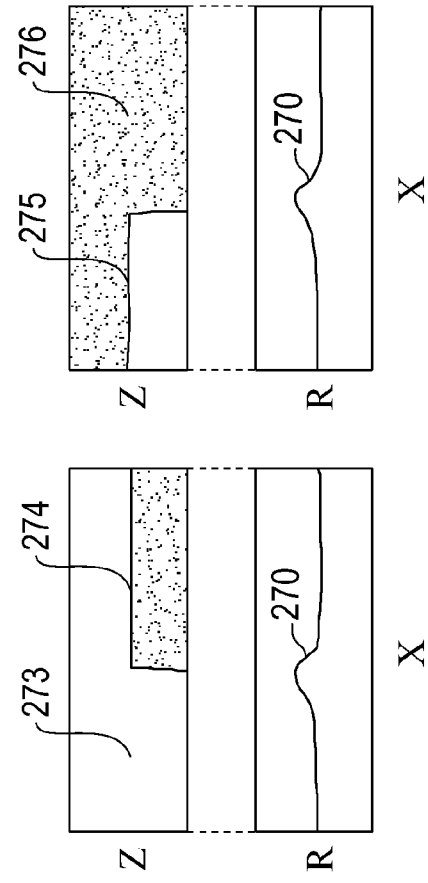

RECORDING DATA SIMULTANEOUSLY AT TWO DEPTHS OF A TILTED MAGNETIC MEDIUM

CROSS REFERENCE TO RELATED APPLICATION

The present application is a continuation of application Ser. No. 11/837,090, filed Aug. 10, 2007, now U.S. Pat. No. 7,773,333.

FIELD OF THE INVENTION

This invention relates to recording on magnetic media, and, more particularly, to the density of magnetic recording.

BACKGROUND OF THE INVENTION

An important issue in magnetic recording is to increase the density of recording. Current magnetic media comprise a continuous recording layer formed of a large number of particles. The magnetic information is recorded in two dimensions defined by the bit length and bit width (or track width), with one bit of information comprising multiple magnetic particles. A transition region exists between two written bits. The transition region has a finite length due notably to inter-particle dipolar coupling, the randomness of the position of the particles, and the distribution of properties within the particles. The size of this transition region limits the recording bit length. To increase storage density, the bit length and/or the bit width must be reduced. However, thermal fluctuations, signal-to-noise and the intrinsic transition region are limits to the reduction of the bit dimensions.

Three dimensional recording is a solution to further increase recording capacity. An example of multi-level recording is a medium of N different layers, each layer having a different switching field. However, N separate write steps are required to set the magnetization in the layers, because first the hardest layer is set, then the next hardest, . . . and finally the state of the lowest coercive layer is set. Another example uses assisted recording, such as thermally assisted recording, coordinating multiple disciplines but still requiring N separate write steps.

SUMMARY OF THE INVENTION

Methods and recording systems are configured for recording data simultaneously at two different depths of a tilted magnetic medium, the tilted magnetic medium having a hard axis of magnetization, the axis being out of a plane of the medium and at an angle of −10 to −80 degrees with respect to a direction along which data are recorded, the medium being capable of having two depths of recording.

In one embodiment, a method embodies writing with selected magnetic fields to simultaneously write at least a first datum and a second different datum at respective two depths within the tilted magnetic medium, in which the amplitudes of the selected writing magnetic fields and the angles of the selected writing magnetic fields with respect to the hard axis direction of the tilted magnetic medium differ at the respective two depths of the magnetic medium such that the recorded direction of the magnetization at the respective two depths can be set independently.

In a further embodiment, the selected writing magnetic fields comprise 4 writing magnetic fields selected in accordance with the angle dependence of the magnetic switching fields of the media.

In a still further embodiment, the 4 writing magnetic fields employ 4 selected write currents with respect to a magnetic write head.

In a still further embodiment, the 4 selected write currents comprise a first and a second write current amplitude, each with positive and negative polarities.

In another embodiment, the first and the second write current amplitudes are selected from three write current amplitudes that include an amplitude ($I_2$) intermediate the other two ($I_1$, $I_3$).

In still another embodiment, wherein the tilted magnetic medium comprises independent layers of tilted magnetic medium, the intermediate write current amplitude is selected such that the depth at which the writing condition changes for the intermediate write current amplitude ($I_2$) is substantially near an interface between the two independent layers.

In another embodiment, the first write current amplitude ($I_1$) is selected to provide writing field angles with respect to the tilted magnetic medium hard axis to write in the same direction at both depths of the tilted magnetic medium, and the intermediate write current amplitude ($I_2$) is selected to provide writing field angles with respect to the tilted magnetic medium hard axis to write in opposite directions at the two depths of the tilted magnetic medium.

In other embodiments, methods and readback systems are configured for reading data from tilted magnetic medium, the tilted magnetic medium having the hard axis of magnetization out of the plane of the medium and at an angle of −10 to −80 degrees with respect to the recording direction, and the medium capable of having two depths of recording. The method comprising the steps of detecting the amplitude of the readback signal of a transition, wherein the greatest amplitude represents a transition between magnetization in one direction at both the depths of recording and magnetization in the opposite direction at both the depths of recording levels, wherein a small bipolar amplitude represents transitions in opposite directions at the two depths of recording, and intermediate amplitude transitions represent other combinations; and determining the transitions by the greatest and the small bipolar amplitude readback signals, and by the amplitudes of the readback signals together with the readback signals of transitions following the detected transitions for the various intermediate amplitude readback signals.

For a fuller understanding of the present invention, reference should be made to the following detailed description taken in conjunction with the accompanying drawings.

BRIEF DESCRIPTION OF THE DRAWINGS

FIG. 5 is a table indicating the direction of magnetization of the tilted magnetic media of FIG. 3 at two different depths written at three different write current amplitudes;

FIGS. 6A, 6B and 6C are diagrammatic illustrations of tilted magnetic media written at three different write currents ($I_1$, $I_2$ and $I_3$) and their respective readback signals;

FIGS. 10A, 10B, 10C, 10D, 10E and 10F are diagrammatic illustrations of combinations of transitions of the tilted magnetic media of FIG. 3 at two different depths written at two different write currents and their respective readback signals.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
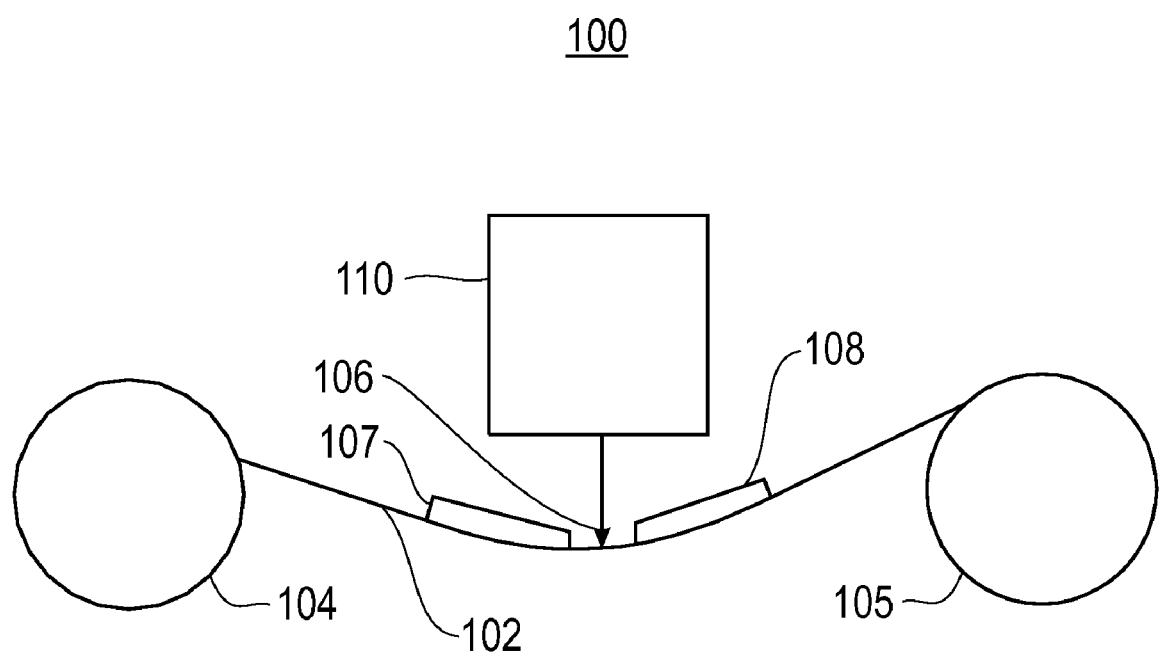
FIG. 1 is a block diagram of a magnetic tape drive which may implement the present invention.

Referring to FIG. 1, a magnetic tape drive 100 is configured to move a magnetic tape 102 between a supply reel 104 and a take-up reel 105. The reels are driven by a servoed motor system to maintain tension on the magnetic tape 102 as it is moved across a magnetic tape head 106. Tape bearings and guides 107 and 108 guide the tape with respect to the magnetic tape head 106, and control the lateral positioning of the magnetic tape. A recording system 110 is coupled to the magnetic tape head 106, and provides the write signals to operate the magnetic tape head for recording on the magnetic tape and receives the signals read by the magnetic tape head from the magnetic tape.

Figure 2:
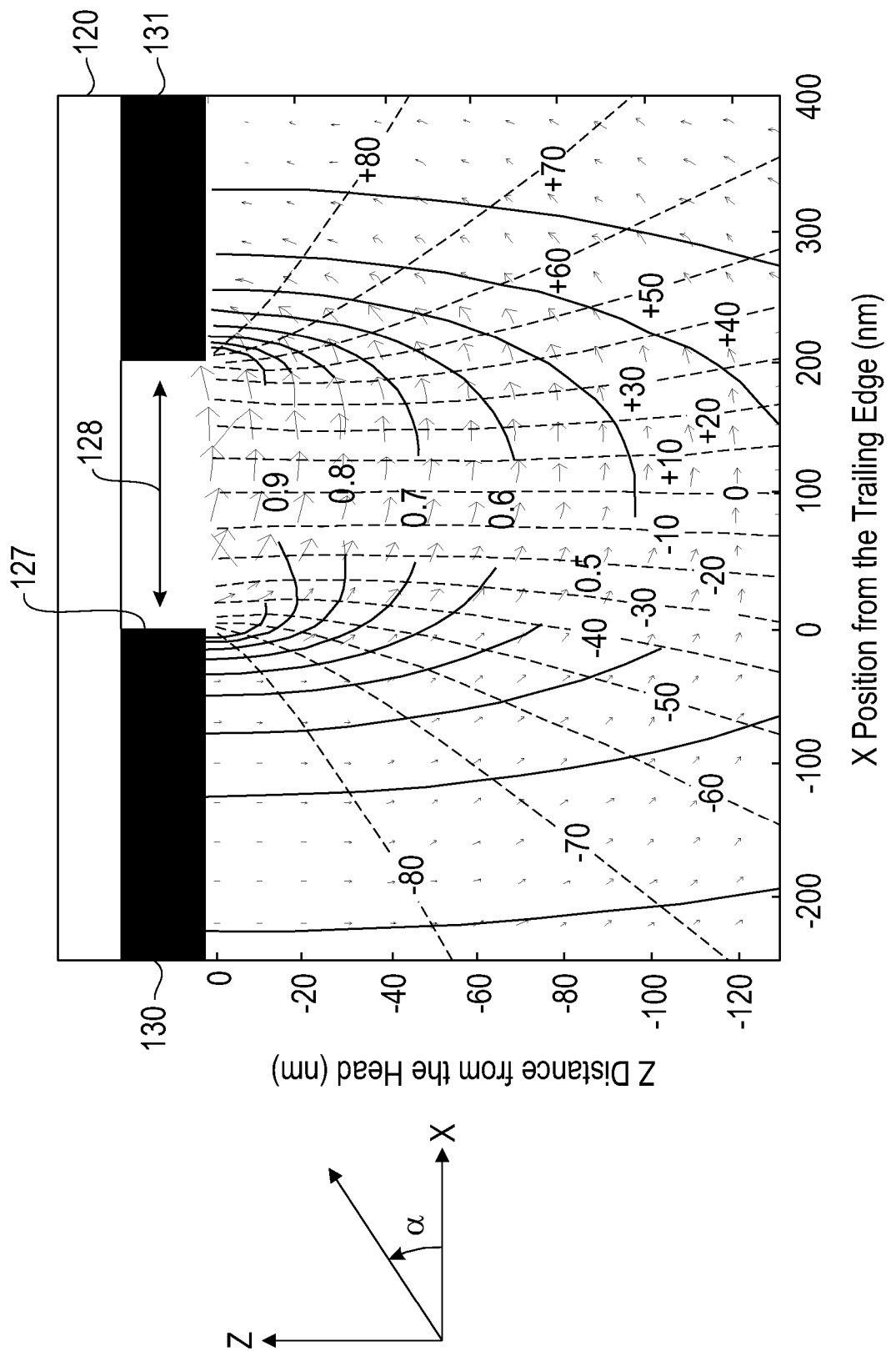
FIG. 2 is a diagrammatic illustration of fields generated by the write head of FIG. 1.

Referring additionally to FIG. 2, the magnetic tape head 106 may comprise a plurality of individual magnetic write heads 120, recording a number of parallel tracks on the magnetic tape 102. One or both of the reels 104, 105 may comprise a tape cartridge or cassette. In FIG. 2, the magnetic head 120 may comprise one of a plurality of parallel heads configured to write on a magnetic tape, or may comprise a single hard disk drive head configured to write on a hard disk medium, or may comprise a floppy disk magnetic head configured to write on a flexible magnetic medium.

Herein the term "medium" is used to indicate at least one medium.

In accordance with the present invention, four levels of write current (two current amplitudes that can be positive and negative) are employed to selectively write at two different depths of a magnetic medium independently. The write head design does not need to be changed a priori compared to conventional longitudinal recording. A conventional read head can also be used to read the medium.

Figure 3:
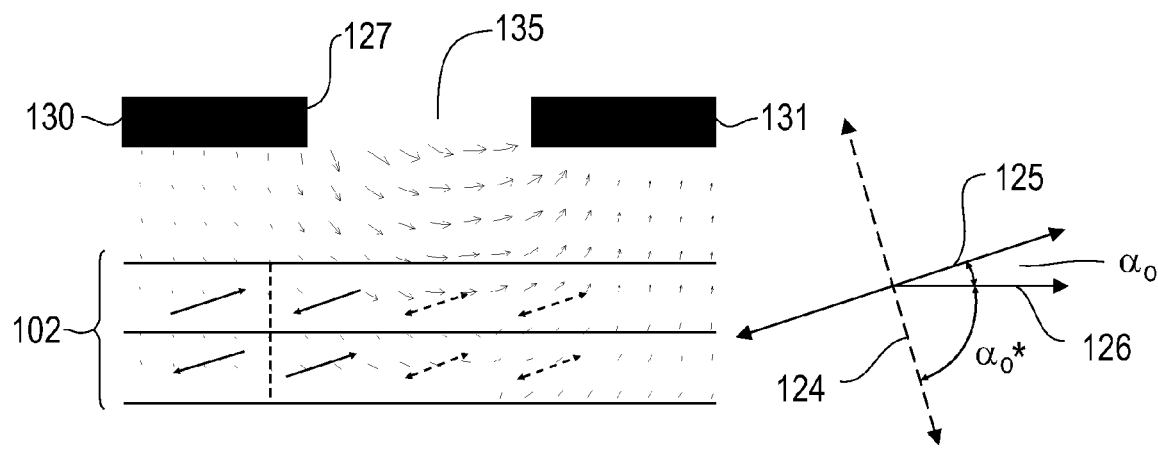
FIG. 3 is a diagrammatic illustration of the write head of FIG. 2 and a tilted magnetic medium in accordance with an embodiment of the present invention.

Referring to FIG. 3, the medium requirements are:
tilted medium 102 with a hard axis direction 124 in the range (−10 degrees; −80 degrees). The hard axis 124 is tilted downward in the direction of motion 126 of the medium with respect to the write head so that the writing is accomplished at the trailing edge 127 of the head write gap 128. Herein, such a downward tilt is referred to as a negative (−) angle with respect to the plane of the medium. For a medium with uniaxial anisotropy, the easy axis 125 is 90 degrees away from the hard axis, thus in the range (+10 degrees; +80 degrees).

The medium needs to have two different levels of recording. This is achieved either by having two physically distinct and independent layers of the medium, or by using single layer medium where the depths of recording are defined by the levels of write current. For the latter, the medium should have multiple particles within its depth that are weakly coupled in order to form two independent levels of recording.

An example of tilted media 102 that is commercially available is AME (Advanced Metal Evaporated) media of the Sony Corporation.

To write a magnetic medium in conventional magnetic recording, a head 120 that produces locally a magnetic field in the medium is used. The field strength applied to the medium depends on the write current, on the dimensions of the write gap 128 between the poles 130 and 131, and on the distance of the medium to the center 135 of the gap. Herein the field angle is important. The field angle also depends on the distance of the medium to the center 135 of the gap. The field angle varies from 0 to almost −90 degrees at the trailing edge 127 of the write head gap as it is illustrated in FIG. 2.

FIG. 2 comprises a representation of magnetic fields generated by a write head. Arrows represent field direction and field amplitude at given points. The solid lines are contour plots of the field normalized to the deep gap field $H_g$ (levels going from 0.2 to 1). The dashed lines are contour plots of the field angle $\alpha$ (levels of 0 degree to ±80 degrees). Note that $H_g$ is proportional to the write current I: $H_g \times g = N \times I \times \epsilon$, with g the write gap, N the number of turns, and $\epsilon$ the efficiency of the head. This is a calculation using Karlquist approximation with a write gap g of 200 nm.

The magnetic particles of the medium switch their magnetization when the field to which they are subjected is larger than their switching field ($H_{SW}$). The value of the switching field depends on the material properties of the magnetic particle (that defines the anisotropy field $H_a$), and of the relative angle $\phi$ between the applied field and the particle easy axis direction.

For a field larger than $H_{SW}$ and an angle $\phi$ between −90 and +90 degrees, the resulting magnetization direction when the field is turned off is +1 (M along ($\phi$=0). For an angle between (−90; −180) or (+90; +180) then the resulting magnetization direction is −1 (M along $\phi$=180).

With a tilted magnetic medium that has its hard axis direction (124 of FIG. 3) at an angle $\alpha_0^*$ out of the medium plane and at an angle between −10 and −80 degrees with respect to a direction along which data are recorded, if the field is larger than Hsw and the field angle $\alpha$ is larger than the hard axis angle $\alpha_0^*$ and smaller than $180+\alpha_0^*$, then the resulting state is +1 (M along the easy axis direction at an angle $\alpha_0$). If the field is larger than Hsw and the field angle $\alpha$ is smaller than the hard axis angle $\alpha_0^*$ and larger than $180+\alpha_0^*$, then the resulting state is −1 (M along $180+\alpha_0$).

Figure 4:
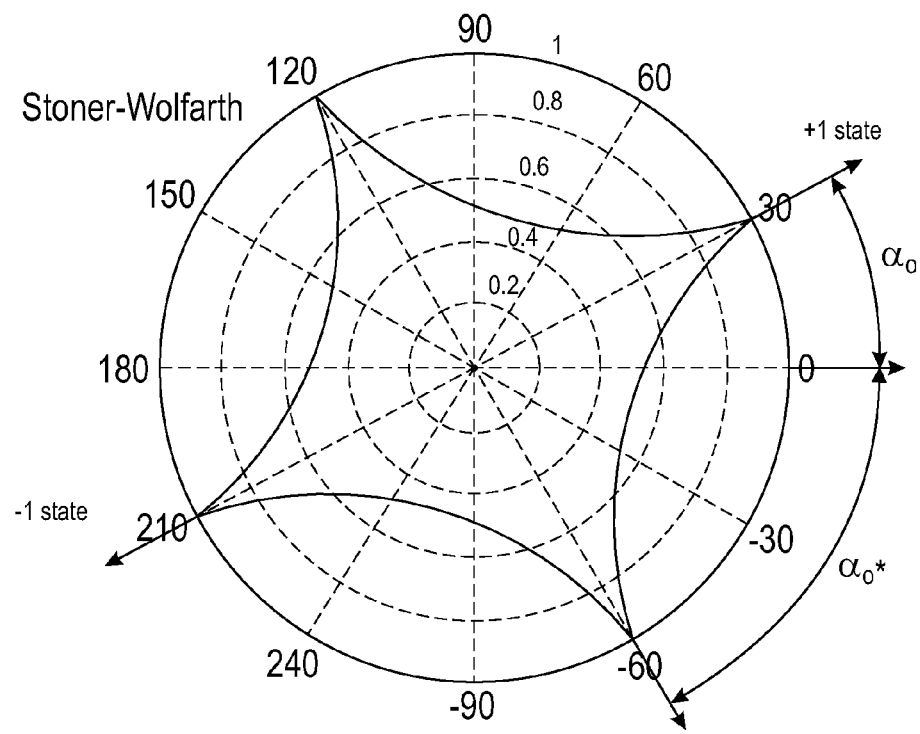
FIG. 4 is a diagrammatic illustration of a Stoner-Wolfarth astroid of magnetic switching fields.

FIG. 4 shows an example of the dependence of the switching field versus the angle of the applied field based on the Stoner-Wolfarth model and a hard axis angle $\alpha_0^*=-60$ degrees and an easy axis angle $\alpha_0=+30$ degrees.

$$H_{SW}=H_a/[(\sin(\alpha-\alpha_0))^{(2/3)}+(\cos(\alpha-\alpha_0))^{(2/3)}]^{(3/2)}.$$

The present method is not limited to, or characterized by, the specific model for describing the dependence of the switching fields to the applied field angles.

Referring to FIG. 2, as discussed above, the fields created by a write head at the trailing edge have angles that vary from 0 to almost −90 degrees (with positive current) depending on the X position (X varying from 0 to −infinity). Moreover, the amplitude of the field decreases if the Z distance to the head increases and if the X position decreases from towards −infinity, but can be tuned by the write current. As a result:

it is possible to set a write positive current such that at all depths of the medium, $0 > \alpha > \alpha_0^*$ and $H \geq H_{SW}$. The boundary of the written bit will be defined at the border $H = H_{SW}$ under the trailing edge. This is for usually low currents or low deep gap field. Then, after removal of all fields, the magnetization snaps back on the easy axis along $+\alpha_0$.

It is also possible to set another write positive current such that at all depths of the medium, $-90 < \alpha < \alpha_0^*$ and $H \geq H_{SW}$. The boundary of the written bit will be defined at the border $H = H_{SW}$ under the trailing edge. This is usually for large currents or large deep gap field. Then, after removal of all fields, the magnetization snaps back on the easy axis along $180+\alpha_0$.

But it is also possible to use as well an intermediate write positive current such that $H \geq H_{SW}$ and $-90 < \alpha < \alpha_0$ only in the top thickness of the medium AND such that simultaneously $H \geq H_{SW}$ and $0 > \alpha > \alpha_0^*$ in the deeper part of the medium. The boundary of the written bit will be defined at the border $H = H_{SW}$ under the trailing edge. Then, after removal of all fields, the magnetization snaps back on the easy axis along $180+\alpha_0$ in the top thickness of the media, and along $\alpha_0$ in the deeper part of the media.

In the case of currents of opposite polarities, the medium is written in opposite directions.

Combinations of positive and negative currents allow writing the magnetization in the direction desired at two various depths of the medium independently. This is summarized in FIG. 5. In FIG. 5, +1 corresponds to magnetization pointing along $+\alpha_0$ and −1 corresponds to magnetization pointing along $180°+\alpha_0$. As discussed hereinafter, note that although three write current amplitudes ($I_1$, $I_2$ and $I_3$) are described, by combining positive and negative currents, only two of the three write currents are needed to obtain all the combinations of writing.

Thus, in one embodiment, independent data are simultaneously recorded at two different depths of the magnetic medium by writing at a first write current amplitude such as ($I_1$); or writing at a second write current amplitude ($I_2$); in which the amplitudes of the writing magnetic fields generated by the head at the write currents and the angles of the writing magnetic fields generated by the head at the write currents with respect to the hard axis angle of the tilted magnetic medium differ at the respective two depths of the magnetic medium such that the recorded direction of the magnetization at the two respective depths can be set independently.

It is preferable to write at write current amplitudes ($I_1$) and ($I_2$), but it is also possible to write at write current amplitudes ($I_2$) and ($I_3$), such that in both cases the first and the second write current amplitudes are selected from three amplitudes that include an amplitude ($I_2$) whose magnitude is intermediate the other two ($I_1$, $I_3$).

In other words, the field amplitude increases with increasing write current. The field amplitude decreases with increasing distance from the write gap center to a position in the medium. The field angle also varies depending on the relative position of the head to the medium. In a magnetic medium with an easy-axis partly tilted out-of-plane: the easy axis of magnetization is (i) oriented at an angle to the plane of the medium and (ii) aligned along the recording direction. The medium is particulate, or made of two thin-film layers. The magnetization direction is set by the write fields from the write head. The resulting magnetization direction at a given point in the medium is defined by the fields applied at this point of the medium. The resulting magnetization direction depends on the field amplitude and on the field angle at the given point in the medium, according to the angular dependence of the switching field of the medium.

A write method is applied to write independently at two depths of the medium. This method uses two write currents (and two polarities for the write current) such that (i) either all the medium is written in the same direction A, (ii) either all the medium is written in the same direction B=−A, (iii) either the top part of the media is written in the direction A and the bottom part of the medium in the direction B, (iv) or the top part of the medium is written in the direction B and the bottom part in the direction A.

In FIGS. 6A, 6B and 6C, the recording results are shown for three different positive currents, corresponding in the example to deep gap field $H_g$ of 7 kOe, 12 kOe and 17 kOe, respectively, and $H_a$ of 6 kOe. The write current and the deep gap field are proportional: $H_g = N \times I \times \epsilon/g$, with N the number of turns, I the write current, $\epsilon$ the head efficiency and g the write gap. The top part of the figures indicates the amplitude of the write current when the write head is at the position (X) along the medium. The center part indicates the position X and the depth (Z) of the medium. The bottom part of the figures indicates the position (X) along the medium and the readback signal (R) read from the medium.

In FIG. 6A, when the media is written with current $+(I_1)$, all the medium is oriented along $+\alpha_0$ 150. When the medium is written with current $-(I_1)$, all the medium is oriented along $180+\alpha_0$ 151. In FIG. 6C, when the medium is written with current $+(I_3)$, all the medium is oriented along $180+\alpha_0$ 161. When the medium is written with current $-(I_3)$, all the medium is oriented along $+\alpha_0$ 160. In FIG. 6B, when the medium is written with current $+(I_2)$, the top part of the medium is oriented along $180+\alpha_0$ 171 and the bottom part of the medium along $+\alpha_0$ 170. When the medium is written with current $-(I_2)$, the top part of the medium is oriented along $+\alpha_0$ 180 and the bottom part of the medium along $180+\alpha_0$ 181.

As discussed above, different types of media may be used. The medium needs to have two levels of recording. This is achieved either by having two independent layers of the medium—CASE 1, or by using a single layer particulate medium where the depth of recording are defined by the amplitude of the write currents—CASE 2.

In the CASE 1, the intermediate write current ($I_2$) needs to be adjusted such that the depth at which the writing condition changes at intermediate current is in between the two recording layers.

Figure 7C:
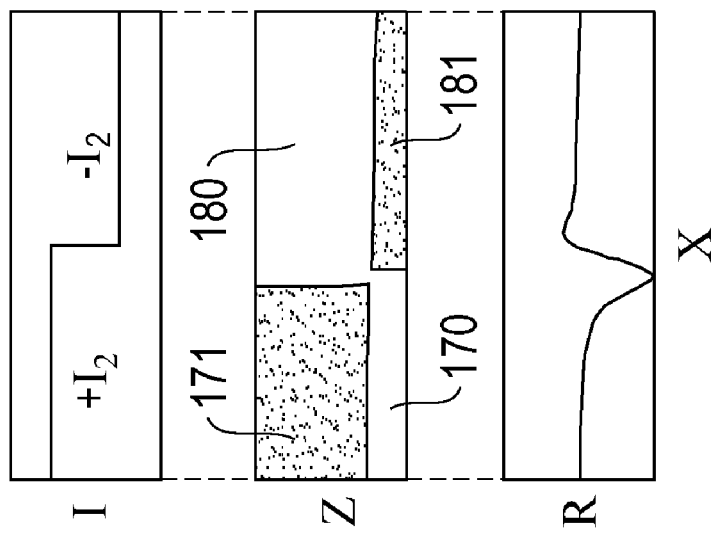
FIGS. 7A, 7B and 7C are diagrammatic illustrations of tilted magnetic media written at three amplitudes of the intermediate write currents ($I_2$) and their respective readback signals.
Figure 7B:
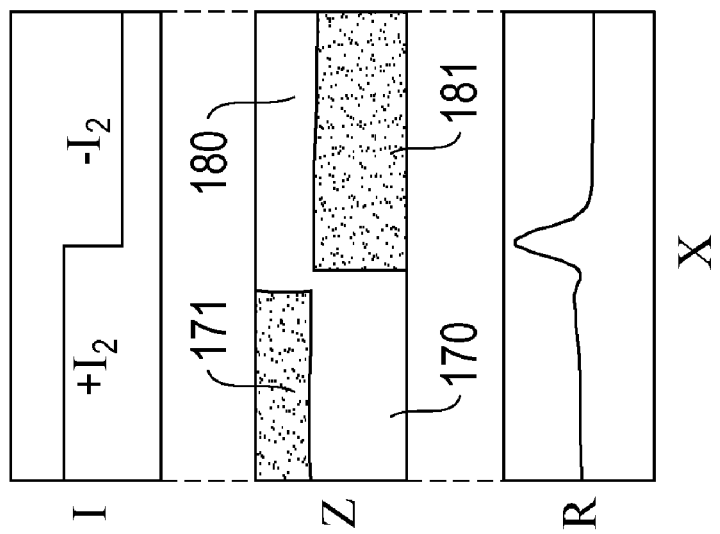
Figure 7A:
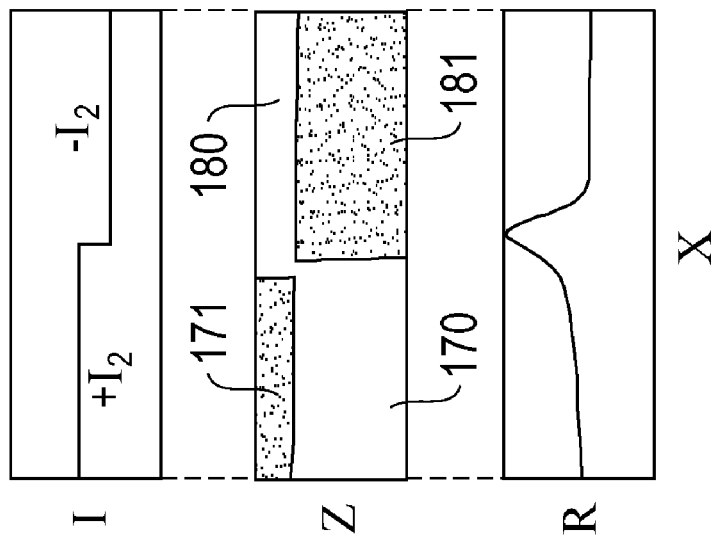

In the CASE 2, the current ($I_2$) defines the depth of the separation for the two levels. This depth can thus be adjusted to any value. Different depths of recording lead to different readback pulse shapes. FIGS. 7A, 7B and 7C illustrate the possibility of writing with various depths of the Z transition of magnetization. This is another degree of freedom to encode information in the medium.

FIGS. 7A, 7B and 7C represent the magnetization ($M_x$ component) of a tilted medium ($\alpha_0^* = -60°$, $\alpha_0 = 30°$) after writing a transition at different write currents (corresponding to three gap fields of 9 kOe, 10 kOe and 14 kOe) where $H_a$ is 6 kOe. The current going from $+(I_2)$ to $-(I_2)$ in the center of the image defines the transition. Below each magnetization is the normalized readback signal. In FIGS. 7A, 7B and 7C, as with respect to FIG. 6B, when the medium is written with current $+(I_2)$, the top part of the medium is oriented along $180+\alpha_0$ 171 and the bottom part of the medium along $+\alpha_0$ 170. When the medium is written with current $-(I_2)$, the top part of the medium is oriented along $+\alpha_0$ 180 and the bottom part of the medium along $180+\alpha_0$ 181.

Thus, in one embodiment, the first write current amplitude ($I_1$) is selected to provide a field angle with respect to the tilted magnetic medium hard axis to write in the same polarity at both depths of the tilted magnetic medium, and the intermediate write current amplitude ($I_2$) is selected to write in opposite directions at the two depths of the tilted magnetic medium.

In the presented examples, the dipolar field due to the tilting of the magnetization out-of-plane are assumed to be negligible compared to the Zeeman field, and was not taken into account. This is a fair approximation with low $M_r$ media. Taking it into account would lead similar results, but with only slightly different write current values. Numerical micromagnetic simulations (that fully takes into account dipolar effects) confirmed the illustrated behavior.

Figures 8, 9:
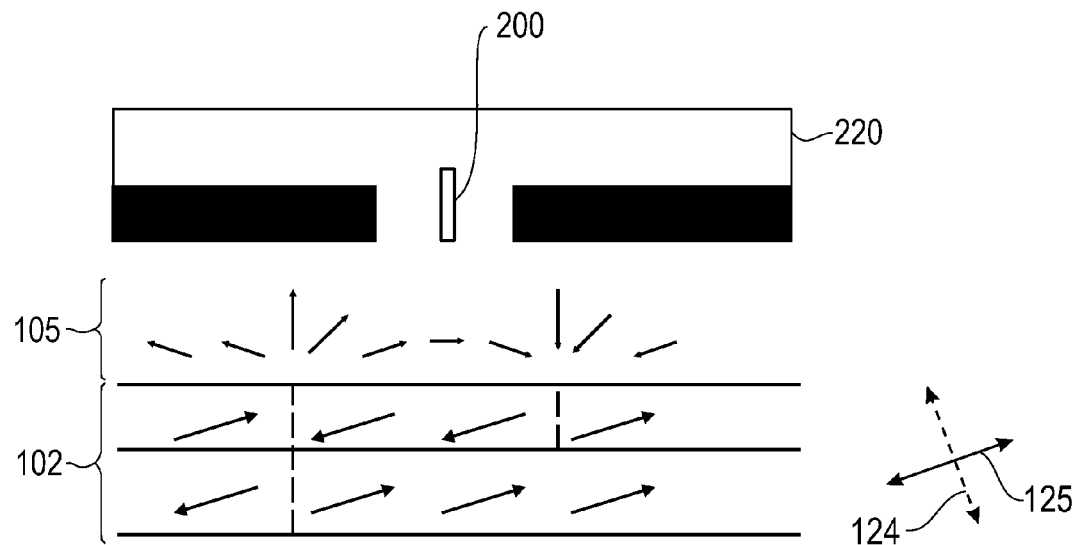
FIG. 8 is a diagrammatic illustration of a read/write head of FIG. 2 and a tilted magnetic medium in accordance with an embodiment of the present invention.
FIG. 9 is a table indicating the possible combinations of transitions of the tilted magnetic media of FIG. 3 at two different depths written at two different write currents.

Referring to FIG. 8, for reading, a conventional reading sensor 200 can be used. As with respect to the write head, a magnetic read/write head, such as tape head 106 of FIG. 1, the head may comprise a plurality of individual magnetic heads 220 of FIG. 8, recording and reading a number of parallel tracks on the magnetic tape 102. The magnetic head 106 may comprise one of a plurality of parallel heads configured to write and read a magnetic tape, or may comprise a single hard disk drive head configured to write and read a hard disk medium, or may comprise a floppy disk magnetic head configured to write and read a flexible magnetic medium. An example of a reading sensor 200 comprises a magneto-resistive (MR) sensor.

The tilted medium 102 has a hard axis direction 124 in the range (−10 degrees; −80 degrees), and an easy axis direction 125 in the range (+10 degrees; +80 degrees) and has been recorded in two levels as discussed above. Arrows sketching the directions of magnetic fields 205 are shown emanating from the recorded medium 102.

Reading sensors usually detect transitions of magnetization in the media. With two levels of recording and two possible directions for the magnetization (along $\alpha_0$ and along $180+\alpha_0$), there are 12 different combination of transitions (see FIG. 9). These transitions are symmetric by pairs (positive pulse and negative pulse).

Figure 11:
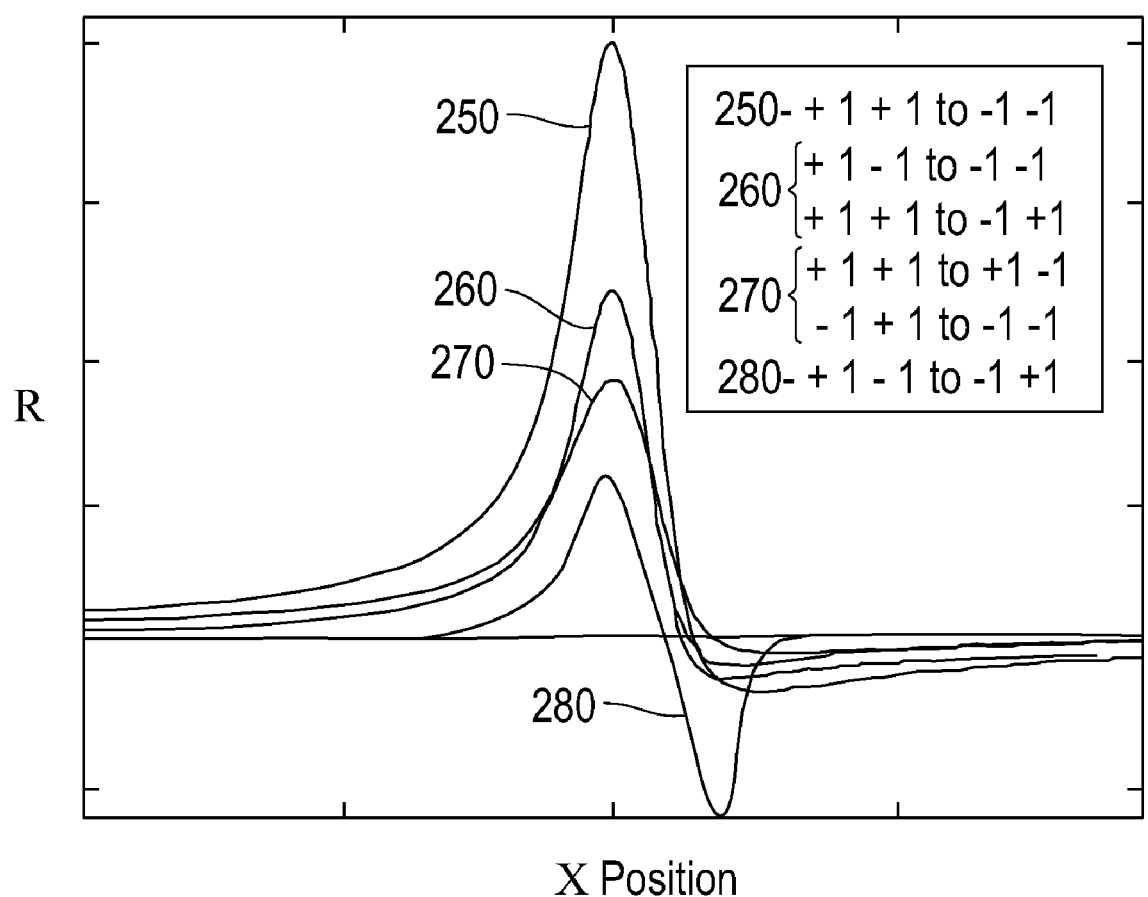
FIG. 11 is a graph comparing the pulse shapes of the readback signals of the tilted magnetic media of FIGS. 10A, 10B, 10C, 10D, 10E and 10F.

The different cases are represented in FIGS. 10A, 10B, 10C, 10D, 10E and 10F together with the corresponding readback pulse transition. The pulse shapes are further compared on FIG. 11. As an example, the cases represent 60 nm thick media, of anisotropy $H_a$=6 kOe, with a write gap of 200 nm, a read gap of 200 nm and a head/media spacing of 30 nm. Karlquist fields approximation is used both for calculating the write fields and for calculating the readback signal.

Four distinct pulse shapes are obtained (pulse shape 250 for a change from "+1+1" 253 to "−1−1" 254 of FIG. 10A; pulse shape 260 for either a change from "+1−1" 263 to "−1−1" 264 of FIG. 10B or a change from "+1+1" 265 to "−1+1" of FIG. 10C; pulse shape 270 for either a change from "+1+1" 273 to "+1−1" 274 of FIG. 10D or a change from "−1+1" 275 to "−1−1" of FIG. 10E; or pulse shape 280 for a change from "+1−1" 283 to "−1+1" 284 of FIG. 10F). The level and shape of each of these can be optimized by changing the value of the write current ($I_2$) such that readback signals 260 and 270 have even more distinctive pulse widths and amplitudes.

The signals of the opposite polarities from those illustrated are exactly inverted.

Both readback signals 260 are essentially similar and readback signals 270 are essentially similar because there is no transition at one level and the same transition at the other level. There is no contribution to the pulse shape from the medium when no transitions are present. It is thus not a surprise that readback signals 260 and readback signals 270 present the same respective pulse shape.

However the magnetization configuration of the readback signal 260 of FIG. 10B as compared to the readback signal 260 of FIG. 10C, and of the readback signal 270 of FIG. 10D as compared to the readback signal 270 of FIG. 10E can be determined by considering the following transition that is necessarily different. The transition after the readback signal 260 of FIG. 10B is necessarily either (1) inverted pulse shape 250 of FIG. 10A; (2) inverted pulse shape 270 of FIG. 10D; or (3) inverted pulse shape 260 of FIG. 10C. The transition after the readback signal 260 of FIG. 10C is necessarily either (1) pulse shape 270 of FIG. 10E; (2) inverted pulse shape 260 of FIG. 10B; or (3) inverted pulse shape 280 of FIG. 10F. Therefore the ambiguity with pulse 260 of FIG. 10B as compared to the readback signal 260 of FIG. 10C is easily released by detecting the next transition. This is the same for differentiating the readback signal 270 of FIG. 10D from the readback signal 270 of FIG. 10E.

The different magnetization combinations with two levels can all be distinguished by the pulse shape of the transition or by the pulse shape of the transition and that of the next transition. This can be included into adapted readback channel and data encoding of the recording system 110 of FIG. 1.

Thus, the readback method comprises the steps of detecting the amplitude of the readback signal of a transition, wherein the greatest amplitude represents a transition between magnetization in one direction at both the depths of recording and magnetization in the opposite direction at both the depths of recording levels, wherein a small bipolar amplitude represents transitions in opposite directions at the two depths of recording, and intermediate amplitude transitions represent other combinations; and determining the transitions by the greatest and the small bipolar amplitude readback signals, and by the amplitudes of the readback signals together with the readback signals of transitions following the detected transitions for the various intermediate amplitude readback signals.

Note that the embodiment for writing/reading at two different levels in a tilted medium is illustrated with a medium tilted with its hard axis at −60 degrees and an intermediate current corresponding to $H_g$=12 kOe and $H_a$=6 kOe. Both the tilt angle of the medium and the intermediate current are free parameters to be optimized for recording. Modeling indicates that best tilted magnetic medium comprises a hard axis of magnetization direction in the range of −10 to −80 degrees, and depends on the write head design, the head-media spacing, and the thickness of the medium. Small negative hard axis angles permit two-level recording with smaller write currents, but the minimum workable hard axis angle is limited notably by head-media spacing and media thickness.

In other words, for reading, the medium generates a stray field at each transition between two written domains. The stray field spatial variation and amplitude depends on the recorded state (or magnetization direction) in the top/bottom part of the medium situated before the transition and in the top/bottom part of the medium situated after the transition. A read head senses the magnetic field generated by the medium and generates read-back voltage (pulse shape) that is specific of the field spatial variation and amplitude. For the 12 different transitions possible, there are 8 different pulse shapes. The discrepancy between the 4×2 equivalent pulse shapes is necessarily released from the measurement of the following pulse shape.

Those of skill in the art will understand that changes may be made with respect to the methods discussed above, including changes to the ordering of the steps. Further, those of skill in the art will understand that differing specific component arrangements may be employed than those illustrated herein.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A method for recording data simultaneously at two different depths of a tilted magnetic medium, said tilted magnetic medium having a hard axis of magnetization, said axis being out of a plane of said medium and at an angle of −10 to −80 degrees with respect to a direction along which data are recorded, said medium being capable of having two depths of recording, comprising the steps of:
    writing with selected magnetic fields to simultaneously write at least a first datum and a second different datum at respective said two depths within said tilted magnetic medium; and
    in which amplitudes of said selected writing magnetic fields and angles of said selected writing magnetic fields with respect to said hard axis direction of said tilted magnetic medium differ at said respective two depths of said magnetic medium such that recorded direction of magnetization at said respective two depths can be set independently.

2. The method of claim 1, wherein said selected writing magnetic fields comprise four writing magnetic fields selected in accordance with angle dependence of the magnetic switching fields of said magnetic medium.

3. The method of claim 2, wherein said four writing magnetic fields employ four selected write currents with respect to a magnetic write head.

4. The method of claim 3, wherein said four selected write currents comprise two write current amplitudes, a first and a second write current amplitude, and each write current amplitude with two polarities, a positive and a negative polarity.

5. The method of claim 4, wherein said first and said second write current amplitudes are selected from three write current amplitudes, that include an amplitude ($I_2$) intermediate the other two ($I_1$, $I_3$).

6. The method of claim 5, wherein said tilted magnetic medium comprises independent layers of tilted magnetic medium, and said intermediate write current amplitude is selected such that the depth at which the writing condition changes for said intermediate write current amplitude ($I_2$) is substantially near an interface between said two independent layers.

7. A recording system comprising:
    a magnetic head configured to provide magnetic fields in response to input signals; and
    a magnetic recording signal generator configured to provide said input signals to said magnetic head to provide magnetic fields, said magnetic fields selected to simultaneously write at least a first datum and a second different datum at respective two depths within a tilted magnetic medium, said tilted magnetic medium having a hard axis of magnetization, said axis being out of a plane of said medium and at an angle of −10 to −80 degrees with respect to a direction along which data are recorded, said medium being capable of having two depths of recording, in which amplitudes of said selected writing magnetic fields and angles of said selected writing magnetic fields with respect to said hard axis direction of said tilted magnetic medium differ at said respective two depths of said magnetic medium such that recorded direction of magnetization at said respective two depths can be set independently.

8. The recording system of claim 7, wherein said input signals provide four writing magnetic fields selected in accordance with angle dependence of the magnetic switching fields of said magnetic medium.

9. The recording system of claim 8, wherein said input signals to provide said four writing magnetic fields comprise four selected write currents for said magnetic head.

10. The recording system of claim 9, wherein said four selected write currents comprise two write current amplitudes, a first and a second write current amplitude, and each write current amplitude with two polarities, a positive and a negative polarity.

11. The recording system of claim 10, wherein said first and said second write current amplitudes are selected from three write current amplitudes, and includes an amplitude ($I_2$) intermediate the other two ($I_1$, $I_3$).

12. The recording system of claim 11, wherein said tilted magnetic medium comprises independent layers of tilted magnetic medium, and said intermediate write current amplitude is selected such that the depth at which the writing condition changes for said intermediate write current amplitude ($I_2$) is substantially near an interface between said two independent layers.

13. The recording system of claim 11, wherein said first write current amplitude is selected from ($I_1$, $I_3$ to provide writing field angles with respect to said tilted magnetic medium hard axis to write in the same direction at both depths of said tilted magnetic medium, and said second write current amplitude ($I_2$) is selected to provide writing field angles with respect to said tilted magnetic medium hard axis to write in opposite directions at said two depths of said tilted magnetic medium.

14. A method for reading data from a tilted magnetic medium, said tilted magnetic medium having a hard axis of magnetization, said axis being out of a plane of said medium and at an angle of −10 to −80 degrees with respect to a direction along which data are recorded, said medium being capable of having two depths of recording, said method comprising the steps of:
    detecting amplitudes of the readback signal of transitions, wherein a greatest amplitude represents a transition between magnetization in one direction at both said depths of recording and magnetization in the opposite direction at both said depths of recording levels, wherein a small bipolar amplitude represents transitions in opposite directions at said two depths of recording, and intermediate amplitude transitions represent other combinations; and
    determining the transitions by said greatest and said small bipolar amplitude readback signals, and by the amplitudes of the readback signals together with the readback signals of transitions following said detected transitions for various said intermediate amplitude readback signals.

15. A readback system comprising:
    a magnetic read head configured to provide readback signals in response to transitions in magnetic fields of a magnetic tape moved with respect to said magnetic read head; and
    a magnetic recording signal detector configured to respond to said readback signals derived from a tilted magnetic medium having a hard axis of magnetization, said axis being out of a plane of said medium and of an angle of −10 to −80 degrees with respect to a direction along which data are recorded, said medium being capable of having two depths of recording, said detector detecting amplitudes of said readback signal of magnetic transitions, wherein a greatest amplitude represents a transition between magnetization in one direction at both said depths of recording and magnetization in the opposite direction at both said depths of recording levels, wherein a small bipolar amplitude represents transitions in opposite directions at said two depths of recording, and intermediate amplitude transitions represent other combinations; and determining the transitions by said greatest and said small bipolar amplitude readback signals, and by the amplitudes of the readback signals together with the readback signals of transitions following said detected transitions for various said intermediate amplitude readback signals.

* * * * *